July 7, 1964     H. D. GROENEWALD, JR     3,139,999
PITMAN DRIVE FOR BALE THROWER Filed April 13, 1961     2 Sheets-Sheet 1

INVENTOR.
H. D. GROENEWALD Jr.

July 7, 1964     H. D. GROENEWALD, JR     3,139,999
PITMAN DRIVE FOR BALE THROWER Filed April 13, 1961     2 Sheets-Sheet 2

INVENTOR.
H. D. GROENEWALD Jr.

_United States Patent Office_ 3,139,999
Patented July 7, 1964

3,139,999
PITMAN DRIVE FOR BALE THROWER
Henry D. Groenewald, Jr., Ottumwa, Iowa, assignor to Deere & Company, Moline, Ill., a corporation of Delaware
Filed Apr. 13, 1961, Ser. No. 102,799
1 Claim. (Cl. 214—83.3)

This invention relates to a bale thrower or ejector and more particularly to improvements in the drive mechanism therefor.

The basic machine in which the present invention constitutes an improvement forms the subject matter of the U.S. patent to Morrison 2,756,865, the basic feature of which is an extension of automatic handling of agricultural material from the swath on the ground to the loading thereof in bale form into a wagon or other vehicle trailing the pickup baler. Thus, the pickup baler functions in its usual manner in picking up the harvested crop, forming same into bales, and the bale thrower or ejector receives the successive bales as they are discharged from the end of the bale case and throws or trajects them rearwardly into the trailing wagon. In a machine or apparatus of that character, the driving mechanism involves a one-revolution clutch which has a crank connected by a pitman or other drive connection to the throwing element so as to cause the element to move cyclically on throwing and return strokes, this element being initially idle at a bale-receiving station and being tripped for operation by emergence of a bale at that station. In a variation of the Morrison design, which forms the subject matter of assignee's copending application Serial No. 7,718 filed February 9, 1960, the means on the bale throwing element for receiving a bale at the bale-receiving station is in the form of a pan or tray onto which the emerging bale moves between the pair of arms that supports the pan or tray. It very often occurs that a bale will emerge beyond or be otherwise improperly disposed at the bale-receiving station while the throwing element is on its return stroke. Thus, the improperly disposed bale forms an obstruction and interferes with complete return of the element to the receiving station, whereas the power means is still continuing to operate. Unless some provision is made to accommodate this situation, considerable damage will occur.

According to the present invention, an improved driving connection is provided which is releasable in the circumstances just noted. A further feature of the driving connection in that it involves shock-absorbing means. In a specific phase of this aspect of the invention, the shock-absorbing means is of the two-way type, being capacitated to absorb shocks at the end of the throwing stroke of the element. More specifically, the improved driving connection entails the use of a pitman means having telescopically related parts which operates in compression on the throwing stroke and in tension on the return stroke, with separable means in the form of a shear pin provided between the two parts to enable elongation of the pitman means in tension when an obstruction or other condition exists such as to interfere with completion of the return stroke of the element.

The foregoing and other important objects and desirable features inherent in and encompassed by the invention will become apparent as a preferred embodiment thereof is disclosed in the ensuing description and accompanying sheets of drawings, the several figures of which are described below.

Figure 1:
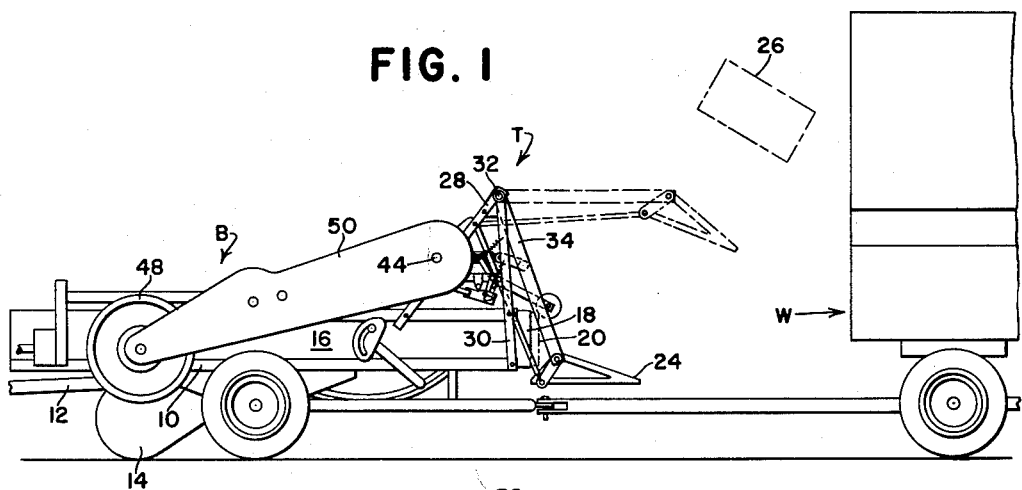
FIG. 1 is an elevational view, on a reduced scale, showing a typical baler-thrower-trailer relationship.

In the typical baler-thrower-trailer relationship illustrated in FIG. 1, the letter B represents what may be regarded as a conventional pickup baler, equipped with a thrower T of the type disclosed in the above-identified copending application, which functions to throw bales to the trailing wagon W. The baler has a main frame 10 including a draft tongue 12 by means of which the baler may be connected to a tractor (not shown) for advance over a field of previously harvested and windrowed crops, which are picked up by the pickup mechanism 14 of the baler and moved into an elongated bale case 16 in which the bale is compacted and tied into bale form by conventional means, the details of which are assumed to be familiar to those versed in the art. As each bale is formed and tied, it emerges at the rear end of the bale case, which may be regarded as a bale-receiving station designated here by the numeral 18. An emerging bale is shown at 20. If the mechanism is functioning properly, the emerging bale 20 will ultimately move rearwardly in an amount represented generally by the broken line at 22 in FIG. 2, at which point it will drop into or be received by a pan or tray 24 which constitutes bale-receiving means for the bale thrower T. As suggested in broken lines at 26 in FIG. 1, the received bale 20 will be thrown to the open front end of the wagon W when the throwing mechanism T is operated.

In the present case, the rear end of the bale case 16, plus additional framework or support structure 28 and 30, represents support means including an upper transverse pivot 32 on which are journalled the upper ends of a pair of arms 34 (only one of which appears in the drawings), the lower ends of which are coaxillay pivoted at 36 to the pan 24. These arms and the pan may be regarded as a throwing element for accomplishing the movement of the bale from the receiving station 18 to the wagon. The throwing element arms 34, in conjunction with associated links 38, complete parallel linkage means for effecting proper movement and positioning of the pan 24 as it travels from the receiving station 18 to what may be regarded as a discharge position as shown in broken lines in FIG. 1, from which discharge position the element 34 moves on a return stroke back to the receiving station 18 to receive a succeeding bale. Each link 38 is pivoted at its upper end at 40 to the frame member 28 and is pivoted at its lower end at 42 to the pan 24. The framework 28–30 may be suitably mounted on the bale case 16, the specific details of which are immaterial, since it is clear that other supporting structure could be provided similar to that shown or even detached from the baler and carried on its own ground wheels, for example.

The power means for driving the bale throwing element 34 on its discharge and return strokes includes a transverse crankshaft 44 driven through the medium of a one-revolution clutch 46 from any suitable power source on the baler, in this case being the baler plunger flywheel 48. The power train from the flywheel 48 to the one-revolution clutch 46 in this case is shielded at 50, but the details are not significant and in any event are disclosed in the above identified Morrison patent. As is typical of drives involving one-revolution clutches, there is provided in the present case a constantly rotating clutch part 52 which is continuously driven from the flywheel 48. The crankshaft 44 represent the intermittently rotating part of the clutch and is normally idle. Driving connection between the two clutch parts 52 and 44 is typically established by allowing a pawl 54, normally retracted by means to be described below, to be engaged by an internal hump or driving part 56 on the constantly rotating clutch part 52. The crankshaft is then picked up by this drive connection and is rotated through 360 degrees or one revolution, the direction of travel being clockwise, after which the pawl 54 is automatically retracted from engagement with the driving hump 56, as will become apparent below, so that the crankshaft again becomes idle or quiescent. The control of the pawl 54 is effected by control mechanism responsive to an emerging bale and includes a bale feeler 58 carried on an arm 60 which is pivoted to the framework at 62 and which has rigid therewith a depending arm 64 which operates through a link 66 to change the position of a pivotally mounted arm 68 which in turn normally holds the pawl 54 radially clear of the driving hump 56. As will be clear, when the bale 20 emerges to its normal position, as suggested at 22, it will raise the feeler 58 which in turn will effect a connection between the feeler arm 64 and the link 66 via a zig-zag slot 70. Then, as the bale 22 drops to the pan 24, the feeler 58 will return to its FIG. 2 position through the force of gravity augmented by the force of a tension spring 72 connected between the frame structure 28–30 and the feeler arm 60. This action will result in a forward force on the link 66 which swings the control arm 68 in a counter-clockwise direction, thus freeing its upper end from the pawl 54 which then under spring load (not shown) will occupy a position in which it is engageable by the hump 56 on the constantly rotating clutch part 52, thereby imparting angular movement to the crankshaft 44 through the one revolution already described.

Figure 3:
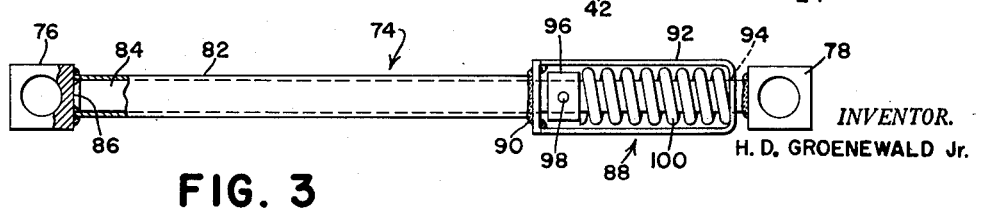
FIG. 3 is an enlarged view, with portions broken away, and shown in section, of the driving means or pitman.

Angular movement of the crankshaft 44 is transmitted to the throwing element 34 by means of a drive means or pitman means indicated in its entirety by the numeral 74, best shown in FIG. 3. The pitman is connected at one end at 76 to the crankshaft 44 and is connected at its other end at 78 to a cross member 80 which joins the two throwing arms 34. The pitman means is operative in compression to cause the crank 44 to drive the throwing element 34 on its discharge stroke. The accelerative forces involved are such that when the pan 24 reaches its discharge position as shown in broken lines in FIG. 1, the bale 26 is literally thrown or trajected to the wagon W. As the crankshaft completes its cycle, it effects the return stroke of the element and returns the pan 24 again to the receiving station 18 to receive the next succeeding bale, assuming that this bale has been properly moved to the receiving station.

Figure 2:
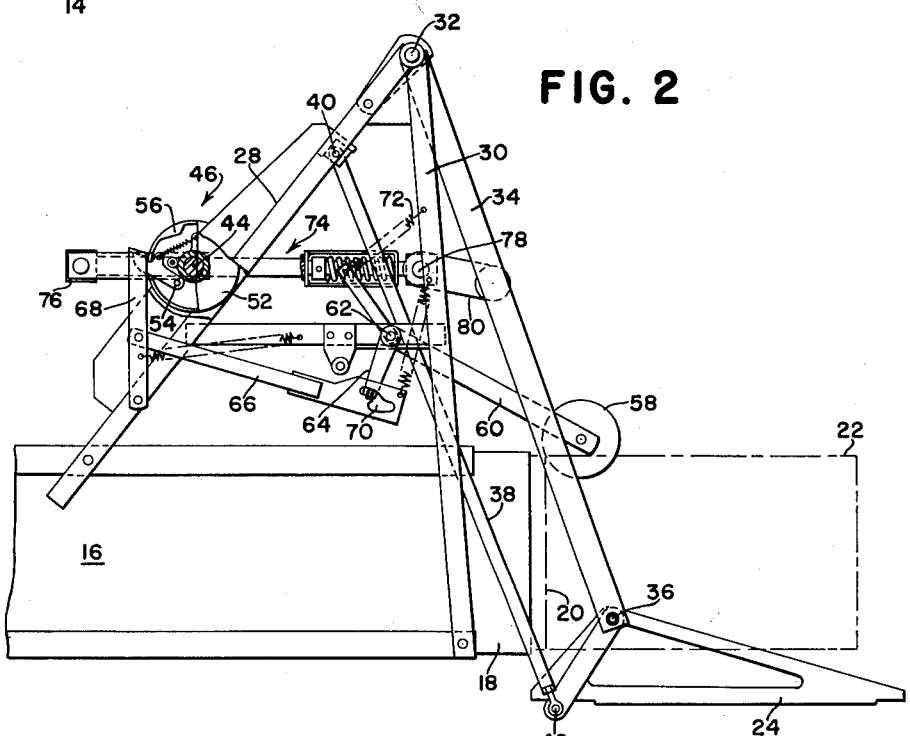
FIG. 2 is an enlarged view, with portions broken away and shown in section, to illustrate the throwing apparatus.
Figure 4:
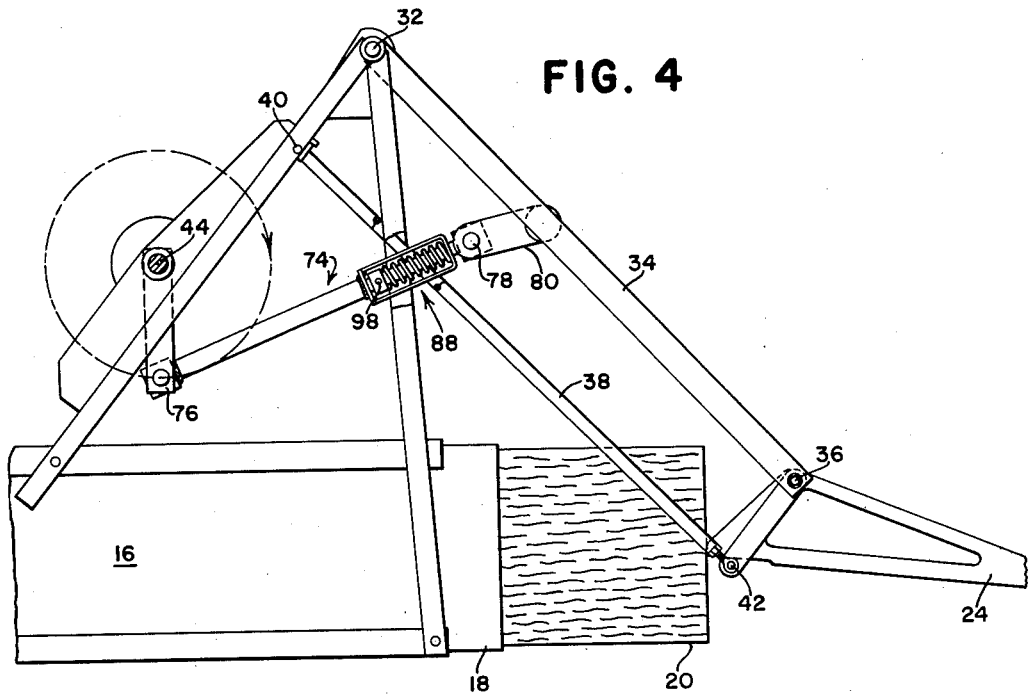
FIG. 4 is a view similar to FIG. 2, but with parts omitted, illustrating a condition in which the return stroke of the throwing element is obstructed by an improperly disposed bale.
Figure 5:
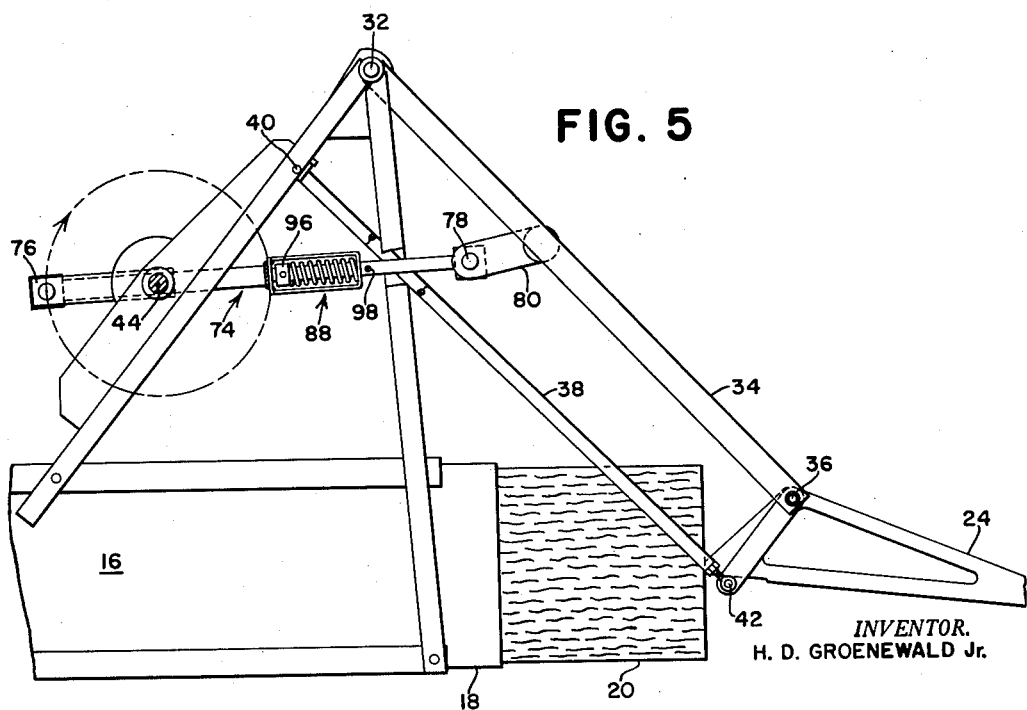
FIG. 5 is similar to FIG. 4 but shows the release or separation of the driving means so that the power means may continue to complete its cycle even though the throwing element is interrupted on its return stroke.

However, it sometimes occurs that formation of the bales in the bale case 16 involves additional accumulation, or other factors occur, which cause the bale to emerge at the bale station in a position somewhat beyond that shown at 20 in FIG. 2. A representative example is shown in FIGS. 4 and 5, wherein the emerging bale 20 has moved rearwardly or outwardly to such an extent that it forms an obstruction to the forward edge of the pan 24 as the pan returns on its stroke to the receiving station 18. In other words, an interference or obstruction is set up which prevents completion of the return stroke of the element 34. At the same time, the power means, including the crankshaft 44, continues in its cycle of operation; that is, the crankshaft 44 ends to complete its one revolution so as to reassume the position of FIG. 2, which is its starting position when the throwing element 34 is normally in its starting position at the receiving station 18.

To overcome the problem thus created, the pitman means 74 is made up of first and second telescopically related parts 82 and 84, the former being tubular and including the connection 76 and the latter being in the form of a rod or bar including the connection 78. The rod or bar 84 is telescopically receivable within the tube 82 and normally abuts the connection 76 as shown at 86, thus capacitating the pitman means 74 to operate in compression to cause or effect the throwing or discharge stroke of the element 34. To effect a connection between the pitman parts 82 and 84 to capacitate same to operate in tension, there is provided a combined separable and shock-absorbing connection indicated in its entirety by the numeral 88. In this case, the tube 82 has rigidly secured thereto, as by welding at 90, a cage 92 which is apertured at its rear end at 94 to permit that portion of the rod 84 to pass loosely therethrough. Thus, the cage 92 may be regarded as a continuation of the tube 82. A stop collar 96 is normally fixed to the portion of the rod 84 within the cage 92, releasable means in the form of a shear pin 98 being used, this pin passing of course diametrically through the collar 96 and the proximate portion of the rod 84. A coiled compression spring 100 encircles the rod 84 within the cage 92, abutting at its front end against the collar 96 and at its rear end against the rear portion of the cage.

When the throwing element 34 is driven on its discharge or throwing stroke and reaches its discharge position, relatively significant accelerative forces are developed. These cause the throwing element 34 to tend to overtravel the limit of the discharge position; that is, it tends to cause elongation of the pitman means 74. The shocks incident to this circumstance are absorbed by the compression spring 100, which is compressed by the collar 96 as the pitman part or rod 84 tends to move rearwardly relative to the pitman part 82 which, of course, stops when the crankshaft 44 attains approximately one-half of its complete revolution, or a point in its angular movement in which it "reverses" its direction to return to its starting position. The forces occurring at this time are of such magnitude that they will not shear the pin 98. Hence, the pitman remains connected, being subject of course to only temporary elongation. Consequently, on the return stroke, the rod 84 tends again to seat against the connection 76 as soon as the throwing element 34 reverses its direction and catches up with the crankshaft, but the main tensional forces created in the pitman 74 on the return stroke act through the cage 92 and spring 100 against the collar 96.

Now, should a bale 20 be improperly disposed at the receiving station, as suggested in FIGS. 4 and 5, the front edge of the pan 24 will strike this bale, thus interfering with completion of the return stroke of the element 34. Nevertheless, the crankshaft 44 continues its clockwise rotation in its attempt to return to its starting position. Forces developed at this time will effect shearing of the pin 98, leaving the pan 24 "hung up" on the improperly emerged bale, and the pitman 74 will of course separate or releaes so that the crankshaft 44 will return to its starting position. This is shown in FIG. 5. FIG. 4 shows the situation just prior to shearing of the pin 98. The pitman parts 82 and 84 are made sufficiently long so that even though the pitman means is elongated as in FIG. 5, the two parts will still be telescopically related; that is, they will still be connected to the extent that they may be readily reconnected when the difficulty is removed and a new shear pin 98 is installed. It will also be appreciated that when the position of FIG. 4 is encountered, the spring 100 will first compress against the collar, thus functioning in this respect as a shock absorber before the shear pin 98 breaks. This establishes the other aspect of the two-way function of the shock absorbing means.

It will thus be seen that a relatively simple drive connection has been provided, and one which readily accommodates the situation in which the return stroke of the throwing element is interfered with. Although normally this situation is relatively infrequently encountered, it is desired that the improved drive connection, or its equivalent, be utilized so as to prevent damage to the apparatus.

Features and advantages of the invention, other than those enumerated herein, will readily occur to those versed in the art, as will many modifications and alterations in the preferred embodiment disclosed, all of which may be achieved without departure from the spirit and scope of the invention.

What is claimed is:

In bale-handling apparatus including support means providing a receiving station to which bales are successively fed, a bale-moving element adapted normally to receive a bale at said station and carried by the support means for movement away from said station on a discharge stroke to discharge said bale and for movement on a return stroke to normally receive a succeeding bale at said station but subject to incompletion of said return stroke because of stoppage of said element by engagement with a succeeding bale fed beyond said station, and power means operative in a predetermimned cycle for driving said element on both strokes, the improvement comprising: pitman means including a tube having an open end and an opposite closed end, a rod telescopically received in the tube and normally abutting said closed end and projecting axially from and beyond said open end and having a connection member thereon in axially spaced relation to said open end, a stop collar on the rod intermediate said connection member and the open end of the tube and axially spaced from the latter, a shear pin normally securing the collar to the rod, a coil compression spring encircling the rod between the collar and the connection member and having one end abutting the collar and its other end disposed axially short of said connection member, and a cage secured to the tube and extending beyond the open end of the tube toward said connection member and radially outwardly of the spring, said cage having a transverse portion adjacent to said connection member and engaging said other end of the spring and apertured to loosely receive the rod.

References Cited in the file of this patent
UNITED STATES PATENTS 2,635,875 Werner _____ Apr. 21, 1953
2,827,155 Callum _____ Mar. 18, 1958